(12) United States Patent  
Erenel et al.

(10) Patent No.: US 10,743,168 B1  
(45) Date of Patent: *Aug. 11, 2020

(54) CALL PRIORITIZATION FOR REDUCING NETWORK CONGESTION

(71) Applicant: International Business Machines Corporation, Armonk, NY (US)

(72) Inventors: Dogukan Erenel, Round Rock, TX (US); Steven D. Clay, Round Rock, TX (US); Michael Rowden, Round Rock, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,835

(22) Filed: Jul. 15, 2019

Related U.S. Application Data

(63) Continuation of application No. 16/291,083, filed on Mar. 4, 2019.

(51) Int. Cl.
| | | |
|---|---|---|
| *H04M 11/04* | (2006.01) |
| *H04W 4/90* | (2018.01) |
| *H04W 72/12* | (2009.01) |
| *H04W 68/00* | (2009.01) |
| *H04W 4/029* | (2018.01) |
| *H04W 28/02* | (2009.01) |

(52) U.S. Cl.
CPC ............. *H04W 4/90* (2018.02); *H04W 4/029* (2018.02); *H04W 28/0289* (2013.01); *H04W 68/005* (2013.01); *H04W 72/1242* (2013.01)

(58) Field of Classification Search
CPC ... H04W 4/90; H04W 28/0289; H04W 4/029; H04W 72/1242; H04W 68/005
USPC ........................................ 455/404.1; 370/338
See application file for complete search history.

(56) References Cited

U.S. PATENT DOCUMENTS

| | | | |
|---|---|---|---|
| 6,282,429 | B1 | 8/2001 | Baiyor et al. |
| 6,754,335 | B1 | 6/2004 | Shaffer et al. |
| 8,068,601 | B2 | 11/2011 | Shaffer et al. |
| 8,824,998 | B2 | 9/2014 | Balthasar et al. |
| 8,976,939 | B1 | 3/2015 | Hamilton et al. |
| 2007/0155362 | A1 | 7/2007 | Davis |

(Continued)

OTHER PUBLICATIONS

Anonymous,"Smarter 911," an IP.com Prior Art Database Technical Disclosure, Ip.com No. IPCOM000226929D, Apr. 24, 2013, 4 pgs.

(Continued)

*Primary Examiner* — Marcos Batista
(74) *Attorney, Agent, or Firm* — Peter K. Suchecki

(57) ABSTRACT

Provided is method, system, and computer program product for reducing telecommunication network congestion during a high call volume event by prioritizing subscriber calls. A processor may receive a notification of an ongoing emergency at a location. The processor may activate an emergency mode at one or more call stations near the location. The processor may receive a plurality of calls at the one or more call stations from one or more callers, wherein the calls are not directed to an emergency service provider. The processor may determine a priority order for each of the calls based on a priority level assigned to each respective caller. The processor may allow the calls to be completed according to the priority order.

13 Claims, 8 Drawing Sheets

(56) References Cited

U.S. PATENT DOCUMENTS

| | | |
|---|---|---|
| 2008/0037763 A1 | 2/2008 | Shaffer et al. |
| 2011/0159839 A1 | 6/2011 | McEwen et al. |
| 2014/0051379 A1* | 2/2014 | Ganesh ................. H04W 4/90 455/404.1 |
| 2019/0098140 A1* | 3/2019 | Slater ................... H04W 4/023 |

OTHER PUBLICATIONS

Badarch et al., "An Adaptive Scheduling Scheme to Efficient Emergency Call Holding Times in Public Safety Network," Proc. IFOST, Ulaanbaatar, 2013, pp. 210-213.

Mell et al., "The NIST Definition of Cloud Computing," Recommendations of the National Institute of Standards and Technology, U.S. Department of Commerce, Special Publication 800-145, Sep. 2011, 7 pgs.

Erenel et al, "Call Prioritization for Reducing Network Congestion," U.S. Appl. No. 16/291,083, filed Mar. 4, 2019.

List of IBM Patents or Patent Applications Treated as Related, Jul. 15, 2019, 2 pgs.

Crackberry, "Emergency Callback Mode, ever heard of it?" https://forums.crackberry.com/general-blackberry-discussion-f2/emergency-callback-mode-ever-heard-82821/, printed Dec. 18, 2019, 4 pgs.

Unknown, "Wireless Priority Service (WPS)—Emergency telecommunications," http://www.ic.gc.ca/eic/site/et-tdu.nsf/eng/h_wj00016.html, printed Dec. 18, 2019, 5 pgs.

Wikipedia, "Nationwide Wireless Priority Service," https://en.wikipedia.org/wiki/Nationwide_Wireless_Priority_Service, printed Dec. 18, 2019, 2 pgs.

* cited by examiner

| Priority Level | Caller Type | Location | Call Request | Placed in Queue |
|---|---|---|---|---|
| 6 | Emergency Personnel | N/A | N/A | No (call immediately connected) |
| 5 | Premium Subscriber | At the emergency location | First call request | Yes |
| 4 | Normal Subscriber | At the emergency location | First call request | Yes |
| 3 | Premium Subscriber | At the emergency location | Subsequent call request | Yes |
| 2 | Normal Subscriber | At the emergency location | Subsequent call request | Yes |
| 1 | Premium Subscriber | Non-emergency location | N/A | Yes |
| 0 | Normal Subscriber | Non-emergency location | N/A | Default priority call or queue |

FIG. 4

CALL PRIORITIZATION FOR REDUCING NETWORK CONGESTION

BACKGROUND

The present disclosure relates generally to the field of communications, and more specifically, to reducing telecommunication network congestion during a high call volume event.

During an emergency, wireless service providers typically receive a large magnitude of telephone calls. The increased number of calls may overload the telecommunication network resulting in a denial of service to subscribers.

SUMMARY

Embodiments of the present disclosure include a method, computer program product, and system for reducing telecommunication network congestion during a high call volume event by prioritizing subscriber calls. A processor may receive a notification of an ongoing emergency at a location. The processor may activate an emergency mode at one or more call stations near the location. The processor may receive a plurality of calls at the one or more call stations from one or more callers, wherein the calls are not directed to an emergency service provider. The processor may determine a priority order for each of the calls based on a priority level assigned to each respective caller. The processor may allow the calls to be completed according to the priority order.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4 illustrates an example table for prioritization determination, in accordance with embodiments of the present disclosure.

Figure 1:
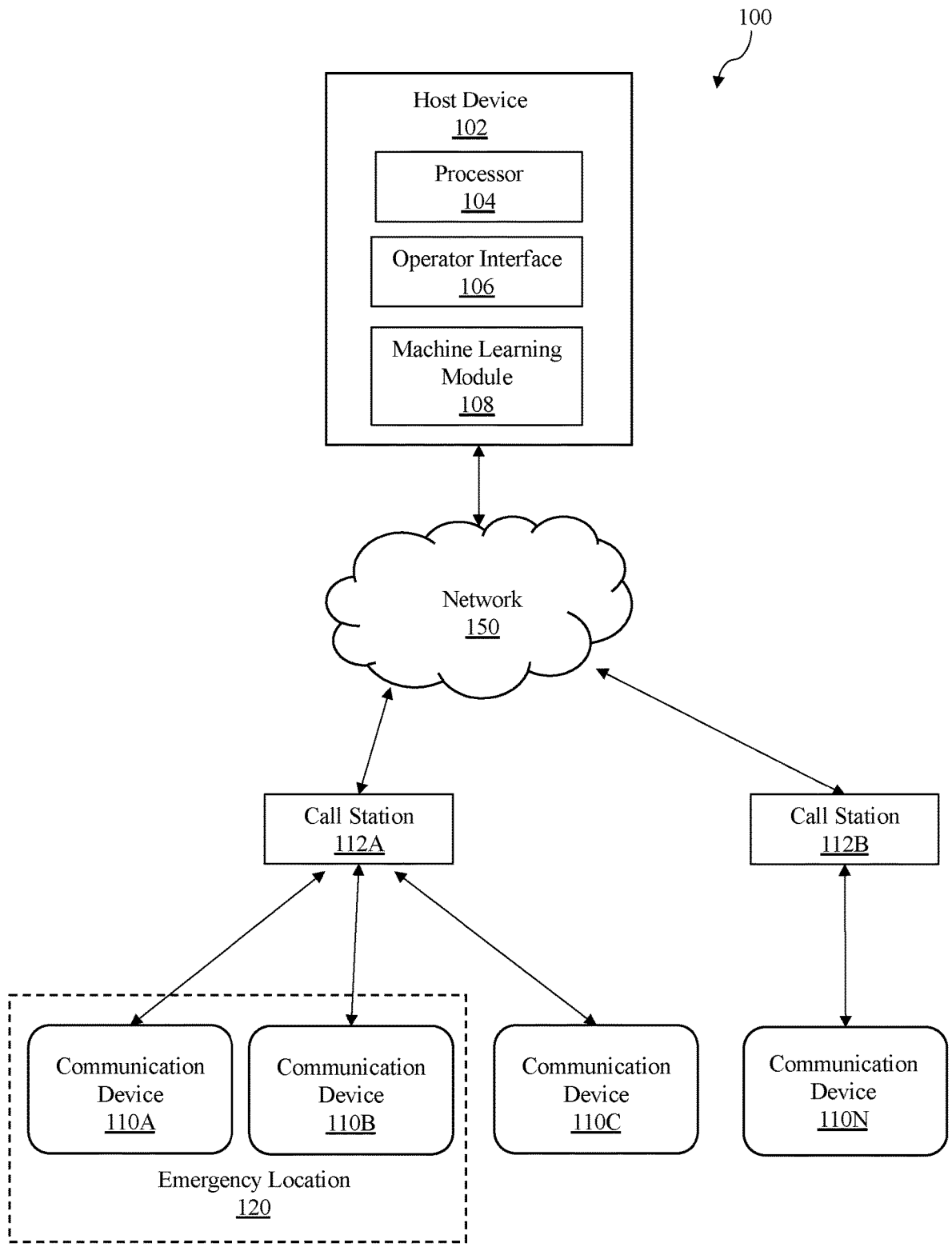
FIG. 1 illustrates a block diagram of an exemplary telecommunication system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to the field of communications, and more particularly to reducing telecommunication network congestion during a high call volume event by prioritizing subscriber calls. While the present disclosure is not necessarily limited to such applications, various aspects of the disclosure may be appreciated through a discussion of various examples using this context.

In an emergency, such as an earthquake or tsunami, telecommunication service providers typically receive a large magnitude of telephone calls from subscribers (e.g., non-emergency personnel) looking to connect with people (e.g., family, friends, neighbors, businesses, etc.) located within the affected area. The increased number of calls typically overload the telecommunication network resulting in a denial of service to subscribers. Further, the overloaded network may prevent subscribers trapped at the emergency location from connecting calls to receive help or vital information.

Some current solutions exist for prioritizing calls from emergency personnel (e.g., police, fire, military, etc.) using emergency service providers (e.g., 911 call center/operators) in order to immediately connect calls relevant to mitigating the emergency. However, these solutions fail to compensate for normal (e.g., non-emergency personnel) subscribers of a service provider.

To prevent subscribers from being denied communication services during an emergency, embodiments of the present disclosure prioritize subscribers (e.g., callers) based on proximity of the subscriber to the emergency location and subscriber status. For example, a subscriber calling from a location that is at or near the emergency location (e.g., cellphone signal pinging a cellular tower near the emergency location) will be assigned a higher priority ranking than a subscriber who is distant from the emergency location. Assigning a higher priority ranking to subscribers near the emergency may allow the subscriber to connect with an intended recipient quicker to prevent a life or death situation. For example, a caller trapped in a damaged building at the determined emergency location may be able to connect with another subscriber quicker using call prioritization. Assigning the caller at the emergency location a higher priority ranking allows the call to be connected when the network may be flooded with calls from other subscribers during the emergency.

Further, a premium subscriber (e.g., hospital, business, etc.) at the emergency location may be ranked higher than a normal subscriber at the same location. In this way, various priority levels may be determined by utilizing certain characteristics for each subscriber. For example, a business may be relevant to providing emergency supplies (e.g., food, water, medical supplies, etc.) to assist emergency responders. The business may be classified as a premium subscriber, such that the assigned priority ranking is increased allowing calls from the business to get through quicker during the emergency. An individual or business may also be able to pay a one-time or recurring fee to their provider in order to be considered a premium subscriber.

Embodiments of the present disclosure further include a priority queue and a call back mechanism to allow the network to mitigate high call volumes. For example, once the priority ranking of the subscriber is determined (e.g., based on proximity and subscriber status), the subscriber is placed in a call back queue. The call back queue uses the priority ranking of the subscriber to place the subscriber in a ranked call back order, such that the highest priority subscriber in the queue will receive a call back indicating a free line is open on the communication network. Once a subscriber is placed in the call back queue, the subscriber may hang up the phone and wait for a call back from the system. The call back mechanism prevents the network from being overloaded with calls by alleviating the need for subscribers to be continually redialing their phones in attempt to reach their intended recipient. This prevents the system from being further congested with callers.

Embodiments of the present disclosure further include a time limit for non-emergency personnel phone calls. The time limit prevents subscribers from monopolizing the line, while allowing more subscribers to get through to other callers. For example, once a subscriber receives a call back from the system indicating there is a free line, the subscriber will be notified of a time limit for the call. After the call is connected, the subscriber is given a certain amount of time to remain on the line. Once the time limit is reach, the call is terminated by the system. The time limit reduces the amount of network congestion by freeing up the system in a determined amount of time for each call. The call time limit also aides in predicting the wait time for subscribers placed in the call back queue.

Thus, embodiments of the present disclosure provide numerous advantages over existing systems, including prioritization of callers based on proximity to an emergency location and subscriber status. Embodiments of the present disclosure further include a call back mechanism for mitigating network congestion. Additionally, embodiments include a time limit for subscriber calls to further alleviate network congestion by allowing more calls to be connected.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an exemplary telecommunication system 100, in accordance with embodiments of the present disclosure. In the illustrated embodiment, telecommunication system 100 includes a host device 102, one or more call stations 112A, 112B (collectively referred to as call station 112) and one or more communication devices 110A, 110B, 110C, 110N (collectively referred to as communication device 110) communicatively coupled via a network 150. The network 150 may be any type of communication network, such as a telecommunication network or a cloud computing network, capable of connecting a telephone call.

Figure 6:
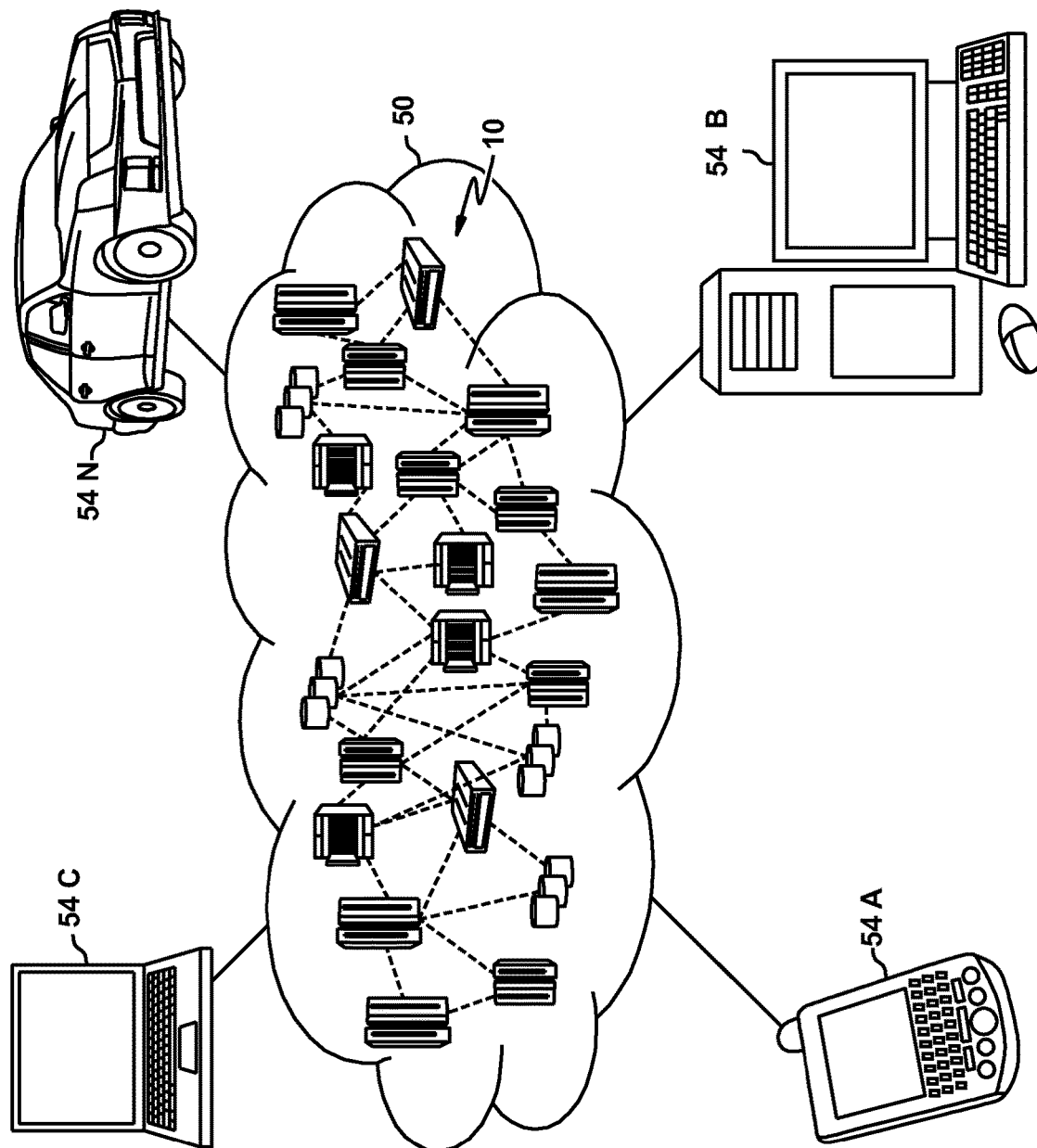
FIG. 6 depicts a cloud computing environment according to an embodiment of the present invention.
Figure 7:
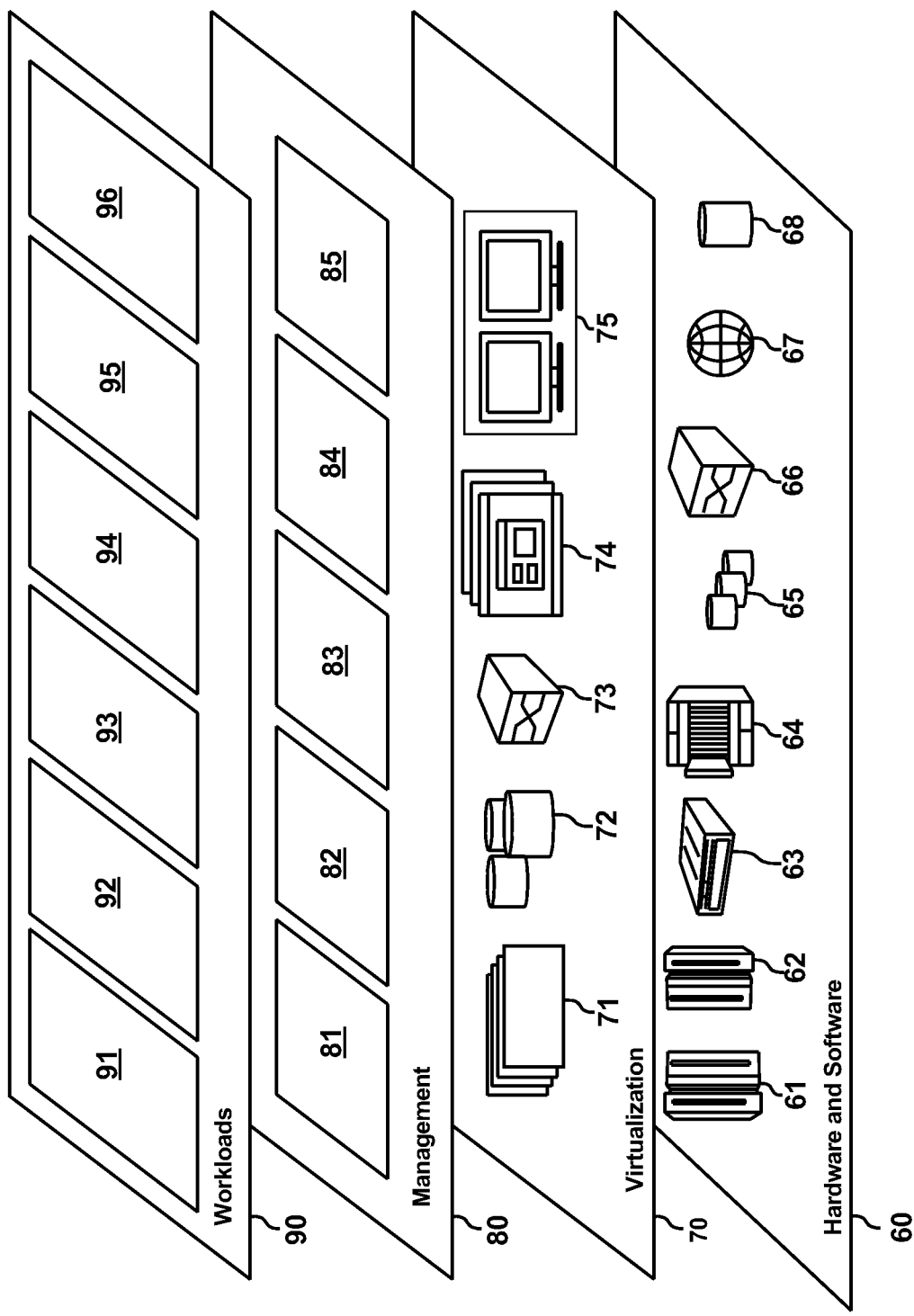
FIG. 7 depicts abstraction model layers according to an embodiment of the present invention.

The network 150 may be substantially similar to, or the same as, network 50 described in FIG. 6 and FIG. 7. In some embodiments, the network can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the host device 102 may communicate with call station 112 and/or communication device 110 using a wide area network (WAN), one or more hardwire connections (e.g., hardwired telephone, a digital subscriber line (DSL), an Ethernet cable, etc.), and/or wireless communication networks. In some embodiments, the various systems may be communicatively coupled using a combination of one or more networks and/or one or more local connections. For example, the host device 102 may communicate with call station 112A using a hardwired connection, while communication between host device 102 and communication device 110A may be through a wireless communication network.

Figure 5:
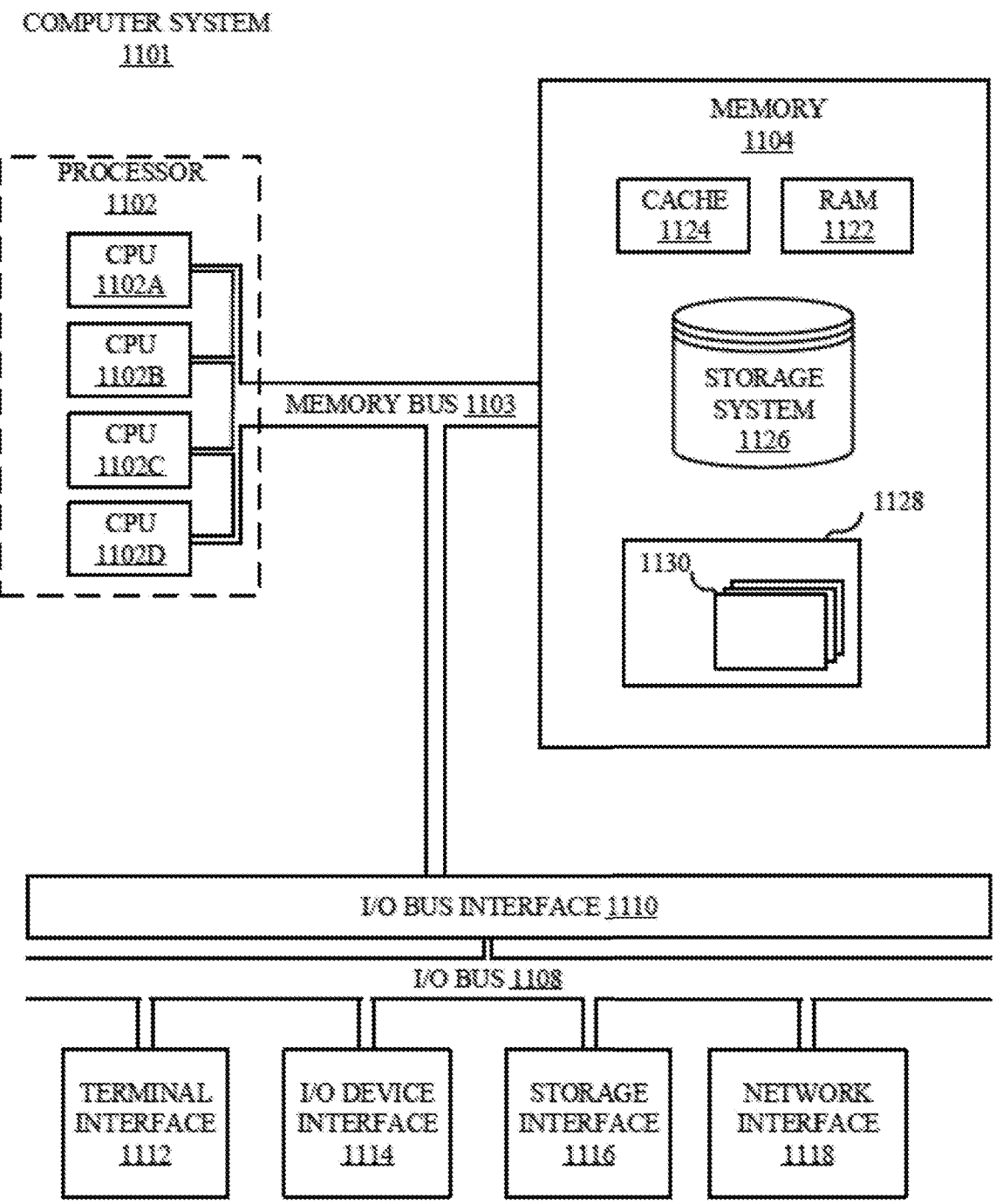
FIG. 5 illustrates a high-level block diagram of an example computer system that may be used in implementing one or more of the methods, tools, and modules, and any related functions, described herein, in accordance with embodiments of the present disclosure.

The host device 102 may be any type of computer system and may be substantially similar to computer system 1101 of FIG. 5. In some embodiments, the host device 102 may allow for manual activation of call prioritization by placing telecommunication system 100 in an emergency mode when an emergency occurs and is determined necessary by a user. For example, placing the system into an emergency mode may be initiated from a remote facility (e.g., a police car, a 911 call center, an authorized master user, or combination of modalities that are in "agreement" that an emergency action may be taken, etc.) by a user. It is assumed that the telecommunication system 100 operates as a normal system (e.g., no call prioritization) until emergency mode is activated.

In an embodiment, emergency mode may be activated by a master user utilizing an operator interface 106 that may be available through a communicatively linked device. Once emergency mode is initiated by a master user, the autonomous nature of the telecommunication system 100 can ensue, allowing the system to mitigate congestion of the telecommunication network for subscribers (e.g., via a priority determination, call back queue, call time limit) during an ongoing emergency (e.g., high call volume event).

In another embodiment, the host device 102 may automatically initiate the emergency mode when a call volume threshold is reached. For example, when the system 100 is inundated with a large amount of calls at call station 112 that exceed the call volume threshold, the host device 102 may activate the emergency mode. In some embodiments, call station 112A may be placed in an emergency mode, while call station 112B remains in a normal mode (e.g., processing calls without priority determination). In another embodiment, both call stations may be placed in an emergency mode, such that call station 112B may assist call station 112A in reducing network congestion at a faster pace.

In another embodiment, the host device 102 may initiate the emergency mode by utilizing a machine learning module 108. The machine learning module 108 may include one or more artificial neural networks configured to learn from various inputs. For example, the host device 102 may use machine learning to process input regarding current emergencies from internet sources (e.g., news websites, blogs, social media, government emergency notifications, traffic patterns, weather, and the like) and correlate the input with current call volumes at call station 112 to determine if an emergency is occurring. As more data is learned by the system 100 (e.g., data relating to the location of the emergency, the type of emergency, weather data, expected duration of the emergency, call volume at call stations near the emergency, prior responses by the system to previous emergencies, etc.) the weights of the neural network can be adjusted, automatically, by processor 104. Over time, the system 100 can become more accurate in determining when to implement the emergency mode to begin prioritizing calls to reduce network congestion.

In another embodiment, the host device 102 may be located at call center 112, at or near the emergency location 120, or may be located at a remote location. The host device 102 may provide updates to the communication devices 110. For example, the host device 102 may send updated queue status for each caller via the communication devices 110. This update may be performed via various communication methods (e.g., text message, email, automated call back). The host device 102 may gather information regarding the emergency and determine length of wait times for the call back queue. The host device 102 may send the communication devices 110 current network congestion information to aide in predicting available call connection times based on priority.

Each communication device 110 may be any type of device that may be used to make a telephone call (e.g., hardwired phone, cellular phone, smartphone, computers). Communication device 110 may include various smart devices (e.g., smartwatches, tablets, etc.) In some embodiments, communication device 110 may be substantially similar to, or the same as, computer system 1101 described in FIG. 5.

In some embodiments, communication device 110 may include a global positioning system (GPS) to allow host device 102 to monitor the location of each communication device within the telecommunication system 100, or in some embodiments, each communication device which attempts to make a call. In this way, utilizing the GPS location of each communication device 110, the host device 102 may determine the position of the device relative to emergency location 120. For example, communication devices 110A and 110B may communicate (e.g., ping) with call station 112A. Because communication devices 110A and 110B are within a determined emergency location 120 based on GPS, the priority level of each respective caller is ranked higher than a caller using communication device 110C outside the emergency location 120.

In some embodiments, communication device 110 may not include a GPS. Therefore, location tracking of the device may be determined by other means (e.g., using caller ID and associated address information, serial ID, IP address information, etc.). In this way, the host device 102 may determine proximity of communication device 110 with relation to the emergency location 120 in order to assign a priority level to the subscriber.

In an embodiment, the host device may determine that call station 112B is not experiencing a high call volume since it is distant from the emergency location 120. Therefore, a call from communication device 110N will be processed according to normal business logic (e.g., connect the call without performing call prioritization).

It is noted that FIG. 1 is intended to depict the representative major components of telecommunication system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the system 100 may not be present, and the arrangement of components may vary.

For example, while FIG. 1 illustrates an example telecommunication system 100 having a single host device 102, two call centers 112 and four communication devices 110, suitable network architectures for implementing embodiments of this disclosure may include any number of host devices, call centers, and communication devices. The various models, modules, systems, and components illustrated in FIG. 1 may exist, if at all, across a plurality of host devices, call centers, and communication devices.

Figure 2A:
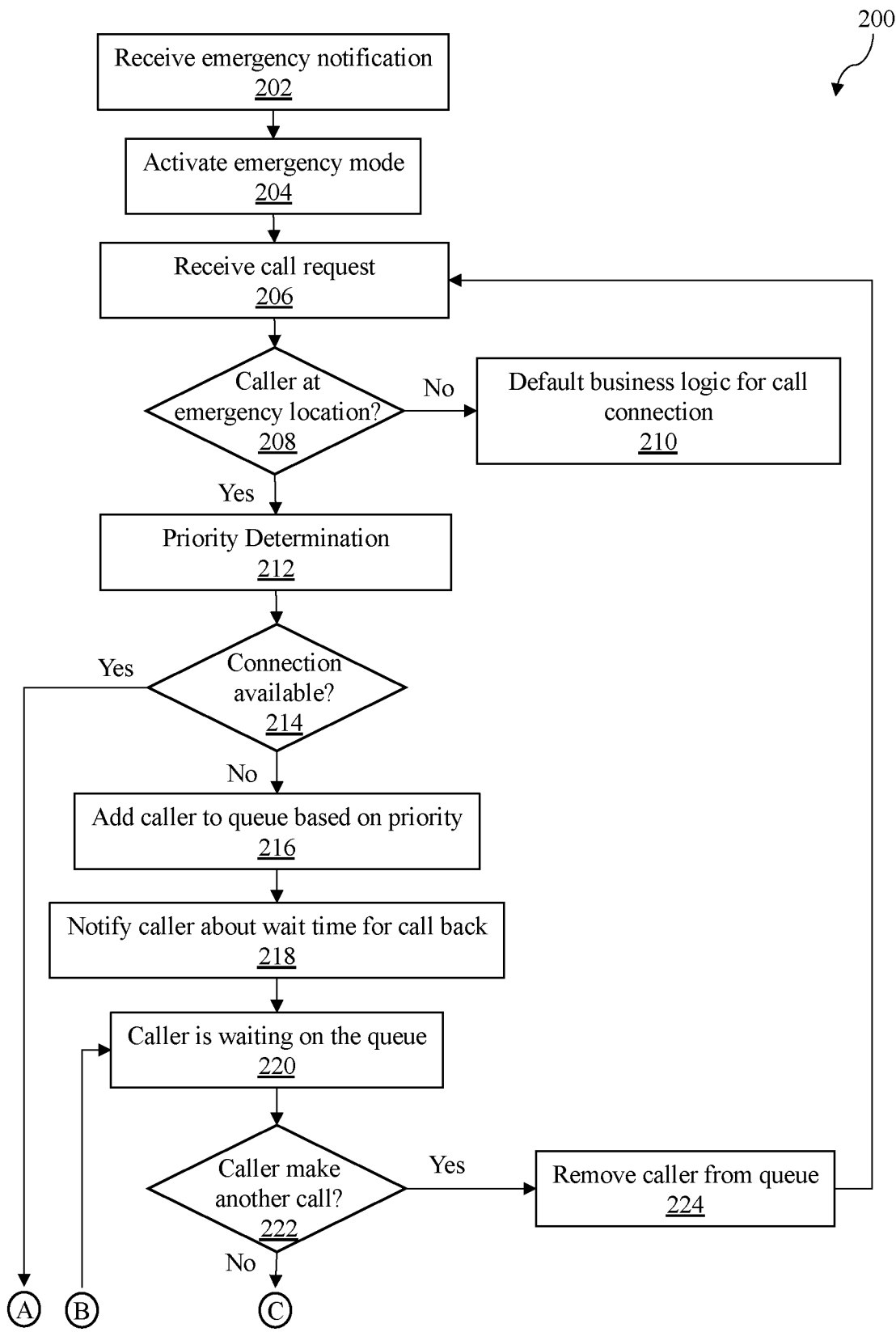
FIG. 2A illustrates a flow diagram of an example process for prioritizing calls from subscribers during an emergency, in accordance with embodiments of the present disclosure.
Figure 2B:
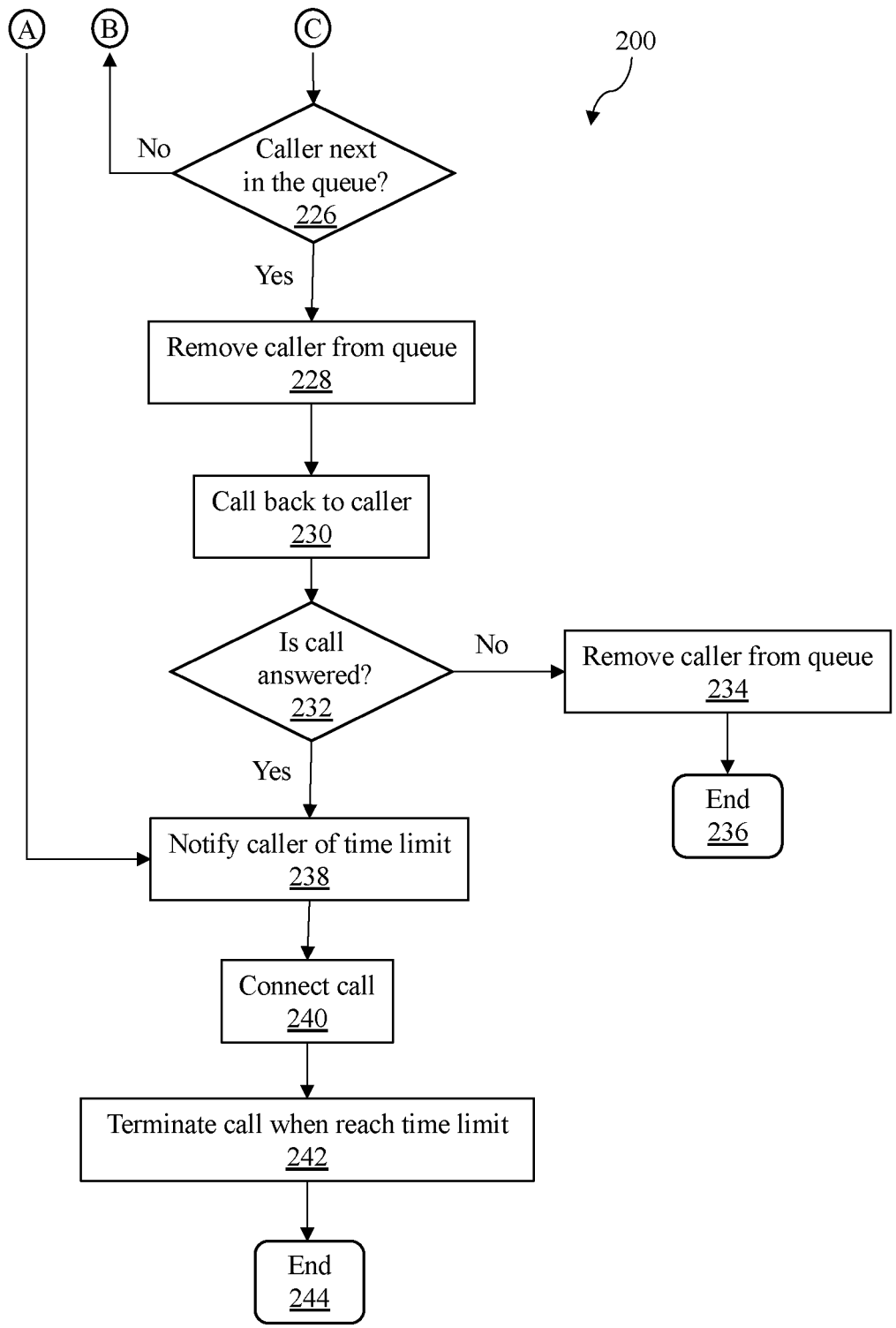
FIG. 2B illustrates a continuation of the flow diagram exemplified in FIG. 2A, in accordance with embodiments of the present disclosure.

Referring now to FIG. 2A and FIG. 2B, shown is a flow diagram in two parts of an example process 200 for prioritizing calls from subscribers during an emergency, in accordance with embodiments of the present disclosure. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process. The process 200 may be performed by processor 104 exemplified in FIG. 1.

The process 200 begins by the processor receiving an emergency notification. This is illustrated at step 202. The emergency notification is any type of notification indicating an emergency situation is ongoing. For example, the emergency notification may be in the form of a call, text, email, or any other form of communication that indicates an emergency situation. The emergency notification may be sent or activated by a master user, or other emergency responder. It is contemplated that various users may send the notification to the system in order to notify the system of an ongoing emergency. The emergency notification may include the location of the emergency, such that the system may determine whether a subscriber (e.g., caller) is calling from a location at or near the emergency. In some embodiments, this step may be optional (e.g., using machine learning).

The process 200 continues by activating an emergency mode for the system in response to receiving the emergency notification. This is illustrated at step 204. For example, one or more call stations at or near an ongoing emergency may experience a high number of call requests. This may overload the system and deny callers the opportunity to reach their intended recipient(s). When the emergency mode is activated, prioritization of calls made using the telecommunication system may be performed to reduce network congestion. In an embodiment, the emergency mode may be activated by a machine learning module without the need of an emergency notification. For example, the machine learning module may process inputs regarding current emergencies from various sources (e.g., news websites, blogs, social media, government emergency notifications, traffic patterns, weather, and the like) and correlate the input with current call volumes to determine if an emergency is occurring.

The process 200 continues by receiving a call request from a subscriber. This is illustrated at step 206. When in the emergency mode, calls are not immediately processed. Rather, the system determines a priority level (shown at step 212) of the caller based on the location of the caller, subscriber status, and the availability of the network for connecting the call. In the illustrated embodiment, it is contemplated that the system is primarily used for subscribers of communication services from a service provider, rather than for emergency personnel. However, it is contemplated that if emergency personnel are using the service, they are immediately given the highest priority level (as described in FIG. 4). For example, a subscriber may have a registered phone number that identifies the caller as an emergency responder. In this way, the emergency responder's caller identification will be recognized by the system and their call request will be immediately connected.

The process 200 continues by determining if the subscriber initiating the call request is at an emergency location. This is illustrated at step 208. If the caller is not at an emergency location (e.g., based on call station receiving the request or large distance from the emergency), the process 200 continues by sending the call to a default business logic setting for call connection. This is illustrated at step 210. For example, a call request that is received from a subscriber from a different call station or tower not experiencing a high volume of calls may connect their call under normal service conditions. In another embodiment, a subscriber that is determined not to be at an emergency location would be assigned the lowest priority and would be transferred to a default message indicating the reason(s) why the call could not be connected (e.g., prevention of overloaded network due to an emergency).

Alternatively, if the caller is determined to be at an emergency location at step 208 the process 200 continues by determining the priority level of the caller. This is illustrated at step 212. During priority determinization, the system will assign a priority ranking or level to each caller by evaluating the subscription status and location of the caller in conjunction with other variables regarding the call. For example, a premium subscriber near the emergency location will be assigned a higher priority level than a non-premium subscriber near the emergency location. Priority determinization is discussed further in FIG. 3.

Once the priority level of the caller is determined, the process 200 continues by determining if a connection for the call is available. This is illustrated at step 214. If a connection is determined to be available, the process 200 continues by notifying the caller of a time limit for their respective call. This is illustrated at step 238 of FIG. 2B. For example, the system may use an automated message indicating to the subscriber they will be given a certain amount of time for their call. In this way, the system may reduce call times of subscribers during the emergency to free up the network. In some embodiments, the time limit for the call may be increased or decreased based on the priority level of the subscriber. For example, a subscriber ranked with a high priority level (e.g., at the emergency location and premium subscriber) may be allotted more time for their call than a lower priority caller.

Referring now to FIG. 2B, once the caller is notified of the time limit for the call, the caller is connected to the recipient of the call. This is illustrated at step 240. The process 200 continues by terminating the call when the time limit for the call is reached if the call has not already been terminated by the caller or recipient, at which point the process 200 ends for this caller. This is illustrated at step 242 and 244, respectively. Using the time limit allows the system to prevent subscribers from monopolizing the lines while other subscribers are waiting to be connected to their calls.

Referring back to FIG. 2A, if a connection for the call is unavailable at step 214, the process 200 continues by adding the caller to a call back queue based on the priority level of the caller. This is illustrated at step 216. The order of callers placed in the call back queue will be determined by their assigned priority level taken from priority determination step 212 detailed in FIG. 3. In the illustrated embodiment, the system is configured to maintain a queue of callers, wherein each caller is sequenced in the queue by a priority order. The queue is a dynamic list that may be updated when new callers having higher or lower priority levels make call requests, callers on the queue are removed because their call is next to be connected, or callers on the queue attempt to make additional calls such that they are removed.

The process 200 continues by notifying the caller placed in the call back queue about a wait time for a call back from the system. This is illustrated at step 218. For example, the system may determine a call back queue wait time by calculating the number of callers in the queue relative to the allotted time limit each caller will receive for their respective phone call. In this way, a caller in the queue can hang up and wait for a call back from the system at a determined time rather than staying on the line and further congesting network. In an embodiment, the wait time for a call back may be updated continuously by the system whenever there is a change to the subscribers wait time. For example, the system may send a communication (e.g., text, email, automated message, etc.) to a subscriber that is listed in the queue to indicate their wait time for a call back has been reduced.

Once the caller is notified about the wait time, the process 200 continues by maintaining the list of callers on the call back queue. This is illustrated at step 220. At this point, each caller may hang up and wait for a call back while the system monitors the queue.

The process 200 continues by determining if a caller in the queue has made another call request. This is illustrated at step 222. If a caller on the queue has made another call request, then this caller is removed from the queue and sent back to step 206 where their call request can be processed. This is illustrated at step 224. A subscriber who makes subsequent call requests may have their priority level decreased in order to prevent subscribers from continually calling the system. In this way, callers may be penalized for increasing the call volume on the network. In some embodiments, the system may notify (e.g., text, email, automated message) the caller that continues to make subsequent call request that their priority level may be decreased as a result.

In another example, a caller may make a subsequent call but have their priority level increased. For example, a caller who is a premium subscriber but not near the emergency location during a first call request may be given a low priority and be placed at the bottom of the queue. However, if the premium subscriber makes a second call request after traveling near the emergency location, the premium subscriber will be given a higher priority level and placed higher on the queue. In such a situation, this may allow a subscriber who is looking for a family member at the scene of the emergency to connect a call more quickly. This allows callers to potentially move to a higher priority level with the queue.

If the caller on the queue has not made another call at step 222, the process 200 continues by determining if the caller is next in the queue. This is illustrated at step 226 in FIG. 2B. If the caller is not next in the queue, the caller remains in the queue as shown at step 220 in FIG. 2A.

If the caller is determined to be next in the call back queue at step 226, the process continues by removing the caller from the queue. This is illustrated at step 228. Once the caller is removed from the queue, a call back is made to the caller. This is illustrated at step 230.

If the call is answered, the process continues by notifying the caller of the time limit for their call request. This is illustrated at step 238. Once the caller is notified of the time limit for the call request, the call is connected to the intended recipient. This is illustrated at step 240. The process continues by terminating the call when the time limit for the call is reached and the process 200 ends. This is illustrated at steps 242 and 244, respectively.

Alternatively, if the call back made to the caller at step 232 is not answered, the process 200 continues by removing the caller from the call queue and ending the process for the respective caller. This is illustrated at steps 234 and 236, respectively. In this way, the queue is freed up to add more callers. In some embodiments, the system may send a notification to the other subscribers on the queue indicating the wait time for a call back has decreased because of the unanswered call.

Figure 3:
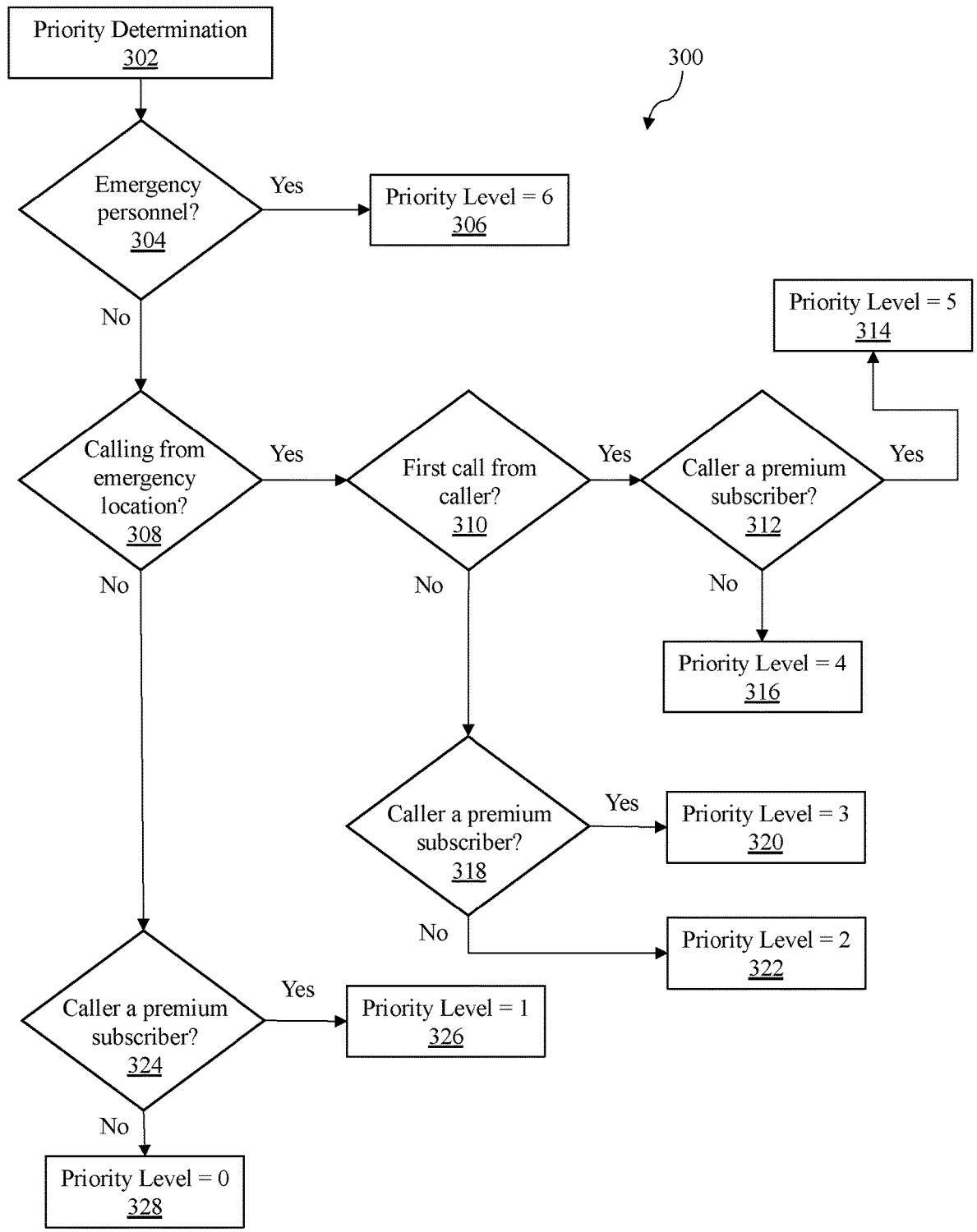
FIG. 3 illustrates a flow diagram of an example process for determining a priority level for a subscriber, in accordance with embodiments of the present disclosure.

Referring now to FIG. 3 shown is a flow diagram of an example process 300 for determining a priority level for a subscriber, in accordance with embodiments of the present disclosure. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by a processor 104 exemplified in FIG. 1.

In the illustrative embodiment, the process 300 may be a subset of priority determination step 212 of process 200 shown in FIG. 2A. The process 300 is shown to begin at priority determination step 302 for clarity. The process 300 continues by determining if the respective caller is emergency personnel. This is illustrated at step 304. If the caller is determined to be emergency personnel at step 304, the process 300 continues by assigning the caller a highest priority level (e.g., priority level 6). This is illustrated at step 306. In the illustrated embodiment, the priority levels run from 0 through 6, such that 0 is the lowest priority level and 6 is the highest priority level. However, in other embodiments, it is contemplated that various types of priority classification numbers and/or rankings may be used. The classification numbers used in FIG. 3 are only used as an example and are not meant to be limiting.

Alternatively, if the caller is determined not to be emergency personnel at step 304, the process 300 continues by determining if the caller is calling from an emergency location. This is illustrated at step 308. The location of the caller may be determined in multiple ways (e.g., GPS, caller ID, IP address, call station, etc.). Once the caller's location is known, the system can determine whether the caller is calling from the emergency location. In some embodiments, this may be determined by utilizing a distance threshold, wherein a certain distance from a pinned location of the emergency will be considered within the perimeter of the emergency location, and/or geofencing, where calls within a certain geographical area defined by a set of geofence boundaries are considered to be at the emergency location.

In another embodiment, a caller may be determined to be within the emergency location based on what call station received the call request. For example, call requests received by a call station at or near the ongoing emergency would be automatically classified as at the emergency location. Alternatively, call requests received at call stations outside the emergency location would be classified as outside of the emergency location.

In another embodiment, a maximum distance threshold from the location of the ongoing emergency may be used to determine if a caller is assigned a priority level, such that if the maximum distance threshold is exceeded the caller will not proceed through a priority determination.

If the caller is determined not to be calling from an emergency location at step 308, then the process 300 continues by determining if the caller is a premium subscriber. This is illustrated at step 324. For example, a call station located at the emergency location may receive calls that are determined to be outside the emergency area. If the caller is determined to be a premium subscriber, the caller is classified as a priority level 1. This is illustrated at step 326. If the caller is determined not to be a premium subscriber and only a normal subscriber, the caller is classified as a priority level 0. This is illustrated at step 328. In some embodiments, multiple levels of subscriber status may be used for priority determination (e.g., gold plan, silver plan, etc.).

Returning to step 308, if the caller is determined to be calling from an emergency location, the process 300 continues by determining if the call request is the first request from the respective caller. This is illustrated at step 310. Callers that make multiple attempts to connect a call may increase the call volume on the network leading to more congestion. To prevent subsequent calls, callers that make additional call requests may have their priority level decreased. If the call request is determined to be the first call request from the caller, then the process 300 continues by determining if the caller is a premium subscriber. This is illustrated at step 312. If the caller is determined to be a premium subscriber, the caller is classified as a priority level 5. This is illustrated at step 314. If the caller is determined not to be a premium subscriber and only a normal subscriber, the caller is classified as a priority level 4. This is illustrated at step 316.

Returning to step 310, if the call request is determined to be a subsequent call request from the same caller, the process 300 continues by determining if the caller is a premium subscriber. This is illustrated at step 318. For example, if the caller previously requested a first call request and was able to connect the call, then subsequent call requests from the same caller would not be given as high of a priority level, since the caller was able to get through to a recipient in a previous attempt. In this way, other subscribers that have not connected a first call request will be higher in priority order. At step 318, if the caller is a premium subscriber, the caller is classified with a priority level of 3. This is illustrated at step 320. Alternatively, if at step 318, the caller is not determined to be a premium subscriber, the caller is classified as a priority level 2. This is illustrated at step 322.

Referring now to FIG. 4, shown is an example table 400 for prioritization determination, in accordance with embodiments of the present disclosure. The table exemplified in FIG. 4 is only used as an example. Alternative prioritization ranges, rankings, values, or criteria may be used in other embodiments. In the illustrated embodiment, the prioritization determination step (e.g., step 212 and 302 shown in FIG. 2A and FIG. 3, respectively) classifies each caller by using a priority level scale ranging 0 through 6, with 0 being the lowest level and 6 being the highest priority level. The priority level is assigned to a caller depending on variables, such as caller type, location of the caller, amount of call requests initiated by the caller, and the like. The priority level assigned to each caller will determine the caller's place in line within the call back queue. However, if a caller is determined to be emergency personnel, the call request is immediately processed and connected to the intended recipient. Higher priority levels are assigned to callers that are at the emergency location and/or have premium subscriber status. Callers that are normal subscribers and not at the emergency location may be assigned the lowest priority level, such that they may be placed at the end of the queue or processed using default logic (e.g., message indicating all lines are full and to call back at a later time).

Referring now to FIG. 5, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 and 300).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 5 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 1101. In some embodiments, however, individual components may have greater or lesser complexity than as represented in FIG. 5, components other than or in addition to those shown in FIG. 5 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for prioritizing call handling during a high call volume situation, the method comprising:
   receiving, by a processor, a notification of an ongoing emergency at a location;
   activating, by the processor, an emergency mode at one or more call stations near the location;

receiving, by the processor, a plurality of calls at the one or more call stations from one or more callers, wherein the calls are not directed to an emergency service provider;

determining, by the processor, a priority order for each of the calls based on a priority level assigned to each respective caller, wherein the priority level of the callers is further based on a number of call attempts made by a caller, wherein a higher number of call attempts decreases the priority level of the the caller; and allowing, by the processor, the calls to be completed according to the priority order.

2. The method of claim 1, further comprising:

determining, by the processor, that a connection is unavailable for a given priority level of the caller;

adding, by the processor and in response to the connection being unavailable, the caller to a queue based on priority level;

determining, by the processor, a wait time that the caller will remain in the queue; and notifying, by the processor, the caller of the determined wait time, wherein once the wait time expires, the caller will receive a call back message indicating the connection is available.

3. The method of claim 2, further comprising:

determining, by the processor, that the connection is available;

identifying, by the processor, that the caller is next in the queue based on the priority order;

removing, by the processor in response to the identifying, the caller from the queue; and calling, by the processor, the removed caller to indicate the caller is next for connecting a call.

4. The method of claim 1, further comprising:

notifying, by the processor, the caller of a time limit for a respective call;

connecting, by the processor, the caller to a recipient; and terminating, by the processor, the respective call when the time limit has expired.

5. The method of claim 4, wherein a length of the time limit for the respective call is based on the priority level of the caller.

6. The method of claim 1, wherein the priority level is further based on at least a subscription status of the caller and a proximity of the caller to the location of the ongoing emergency, such that a higher subscription status of the caller and a closer proximity to the location result in a higher priority level.

7. The method of claim 1, wherein a maximum distance threshold from the location of the ongoing emergency is used to determine whether the caller is assigned the priority level, such that if the maximum distance threshold is exceeded the caller will not proceed through a priority determination.

8. The method of claim 1, wherein a highest priority level is given to the one or more callers who are emergency responders.

9. The method of claim 1, wherein receiving the notification of the ongoing emergency at the location comprises:

processing inputs received from a notification source, wherein the notification source is selected from the group consisting of:
a news website;
a blog;
a social media website;
a government emergency notification;
a traffic pattern website; and
a weather pattern website;
and correlating the inputs with current call volumes to determine whether the ongoing emergency is occurring.

10. A method for prioritizing call handling during a high call volume situation, the method comprising:

receiving, by a processor, a notification of an ongoing emergency at a location;

activating, by the processor, an emergency mode at one or more call stations near the location;

receiving, by the processor, a plurality of calls at the one or more call stations from one or more callers, wherein the calls are not directed to an emergency service provider;

determining, by the processor, a priority order for each of the calls based on a priority level assigned to each respective caller;

determining, by the processor, that a connection is unavailable for a given priority level of a caller;

adding, by the processor and in response to the connection being unavailable, the caller to a queue based on priority level;

determining, by the processor, a wait time that the caller will remain in the queue;

notifying, by the processor, the caller of the determined wait time, wherein once the wait time expires the caller receives a call back message indicating the connection is available; and allowing, by the processor, the calls to be completed according to the priority order.

11. The method of claim 10, wherein receiving the notification of the ongoing emergency at the location comprises:

processing inputs received from a notification source, wherein the notification source is selected from the group consisting of:
a news website;
a blog;
a social media web site;
a government emergency notification;
a traffic pattern website; and
a weather pattern web site;
and correlating the inputs with current call volumes to determine whether the ongoing emergency is occurring.

12. A method for prioritizing call handling during a high call volume situation, the method comprising:

receiving, by a processor, a notification of an ongoing emergency at a location;

activating, by the processor, an emergency mode at one or more call stations near the location;

receiving, by the processor, a plurality of calls at the one or more call stations from one or more callers, wherein the calls are not directed to an emergency service provider;

determining, by the processor, a priority order for each of the calls based on a priority level assigned to each respective caller, wherein the priority level is further based on a number of call attempts made by the respective caller, wherein a higher number of call attempts decreases the priority level of the respective caller;

determining, by the processor, that a connection is unavailable for a given priority level of a caller;

adding, by the processor and in response to the connection being unavailable, the caller to a queue based on priority level;

determining, by the processor, a wait time that the caller will remain on the queue;

notifying, by the processor, the caller of the determined wait time, wherein once the wait time expires, the caller will receive a call back message indicating the connection is available; and allowing, by the processor, the calls to be completed according to the priority order.

13. The method of claim 12, wherein receiving the notification of the ongoing emergency at the location comprises:

processing inputs received from a notification source, wherein the notification source is selected from the group consisting of:
a news website;
a blog;
a social media website;
a government emergency notification;
a traffic pattern website; and
a weather pattern website;
and
correlating the inputs with current call volumes to determine whether the ongoing emergency is occurring.

* * * * *